United States Patent
Radulescu et al.

(10) Patent No.: US 9,144,003 B2
(45) Date of Patent: Sep. 22, 2015

(54) APPARATUS AND METHOD FOR A CONNECTED MODE WITH REDUCED SIGNALING

(71) Applicant: QUALCOMM Incorporated, San Diego, CA (US)

(72) Inventors: Andrei Dragos Radulescu, San Diego, CA (US); Rajat Prakash, San Diego, CA (US); Peerapol Tinnakornsrisuphap, San Diego, CA (US); Damanjit Singh, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 13/797,991

(22) Filed: Mar. 12, 2013

(65) Prior Publication Data

US 2013/0294405 A1   Nov. 7, 2013

Related U.S. Application Data

(60) Provisional application No. 61/641,797, filed on May 2, 2012.

(51) Int. Cl.
*H04W 4/00* (2009.01)
*H04W 36/34* (2009.01)
(Continued)

(52) U.S. Cl.
CPC .......... *H04W 36/34* (2013.01); *H04W 36/0033* (2013.01); *H04W 36/0055* (2013.01); *H04W 16/32* (2013.01); *H04W 36/16* (2013.01); *H04W 36/165* (2013.01); *H04W 36/18* (2013.01)

(58) Field of Classification Search
CPC ..... H04W 36/34; H04W 36/36; H04W 36/16; H04W 36/165; H04W 36/18
USPC .......................................... 370/311, 331, 332
See application file for complete search history.

(56) References Cited

U.S. PATENT DOCUMENTS 6,606,485 B1 *   8/2003   Chen et al. .................... 455/140
2005/0288028 A1 * 12/2005 Lim et al. ...................... 455/442
(Continued)

FOREIGN PATENT DOCUMENTS

WO   2009135931 A1   11/2009
WO   2011160059 A1   12/2011

OTHER PUBLICATIONS

"3GPP TS 36.300 V8.5.0 (May 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" 3GPP TS 36.300 V8.5.0, May 1, 2008, pp. 1-134, XP002532523.
(Continued)

*Primary Examiner* — Farah Faroul
(74) *Attorney, Agent, or Firm* — Fariba Yadegar-Bandari

(57) ABSTRACT

A method, an apparatus, and a computer program product for wireless communication are provided. The apparatus preserves a state of a user equipment (UE) in an anchor evolved node B (eNB), wherein the anchor eNB is one of a set of connected cells, the UE being in a connected mode. Each cell of the connected set has a corresponding coverage area. The apparatus then maintains the state of the UE in the anchor eNB when the UE moves from a coverage area of the anchor eNB to a coverage area of another one of the cells from the set of connected cells.

98 Claims, 8 Drawing Sheets

(51) Int. Cl.
  *H04W 36/00* (2009.01)
  *H04W 36/16* (2009.01)
  *H04W 36/18* (2009.01)
  *H04W 16/32* (2009.01)

(56) References Cited

U.S. PATENT DOCUMENTS

| | | |
|---|---|---|
| 2008/0279150 A1 | 11/2008 | Shousterman et al. |
| 2009/0104905 A1 | 4/2009 | DiGirolamo et al. |
| 2010/0069094 A1 | 3/2010 | Chin et al. |
| 2010/0103821 A1* | 4/2010 | Palanki et al. ............... 370/241 |
| 2010/0105404 A1* | 4/2010 | Palanki et al. ............... 455/450 |
| 2010/0234010 A1 | 9/2010 | Fischer |
| 2011/0092211 A1* | 4/2011 | Osborn ........................ 455/436 |
| 2012/0127949 A1* | 5/2012 | Yoshimoto et al. .......... 370/329 |
| 2012/0188983 A1 | 7/2012 | Mihaly et al. |
| 2012/0263145 A1* | 10/2012 | Marinier et al. ............. 370/331 |
| 2012/0289231 A1 | 11/2012 | Balachandran et al. |
| 2013/0070731 A1* | 3/2013 | Lim et al. ..................... 370/331 |
| 2013/0260811 A1* | 10/2013 | Rayavarapu ................. 455/509 |
| 2013/0288642 A1* | 10/2013 | Yang ............................ 455/410 |
| 2013/0301439 A1* | 11/2013 | Heo et al. ..................... 370/252 |
| 2014/0051428 A1* | 2/2014 | Jung et al. ................. 455/422.1 |
| 2014/0051442 A1* | 2/2014 | Yang et al. ................... 455/436 |
| 2014/0071930 A1* | 3/2014 | Lee et al. ..................... 370/329 |
| 2014/0198767 A1* | 7/2014 | Heo et al. ..................... 370/331 |
| 2014/0219152 A1* | 8/2014 | Anto et al. ................... 370/311 |
| 2014/0220974 A1* | 8/2014 | Hsu .............................. 455/436 |
| 2014/0221036 A1* | 8/2014 | Lee et al. ..................... 455/518 |
| 2014/0256324 A1* | 9/2014 | Mohanty et al. ............. 455/436 |
| 2015/0045088 A1* | 2/2015 | Chen ............................ 455/525 |

OTHER PUBLICATIONS

International Search Report and Written Opinion—PCT/US2013/039336—ISA/EPO—Sep. 25, 2013.

* cited by examiner

APPARATUS AND METHOD FOR A CONNECTED MODE WITH REDUCED SIGNALING

CLAIM OF PRIORITY UNDER 35 U.S.C. §119

This application claims the benefit of U.S. Provisional Application Ser. No. 61/641,797, entitled "APPARATUS AND METHOD FOR A CONNECTED MODE WITH REDUCED SIGNALING" and filed on May 2, 2012, which is assigned to the assignee hereof and expressly incorporated by reference herein in its entirety.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as a Node B, evolved Node B (eNB), or other access point, via transmissions on the forward and reverse links. The forward link (or downlink) refers to the communication link from the base stations to the UEs, and the reverse link (or uplink) refers to the communication link from the UEs to the base stations. This communication link may be established via a single-in-single-out, multiple-in-single-out or a multiple-in-multiple-out (MIMO) system.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, currently, a UE has the option of two modes. In a connected mode, as the UE travels between cells, the UE must be handed over between each cell. For example, a source cell must transmit a message to a target cell. A corresponding configuration must be signaled and confirmed with the target cell. Thus, for a UE with infrequent data bursts, such signaling during a connected mode can cause excessive signaling and/or battery use because the required signaling places a drain on the battery life of the UE. In idle mode, while the UE is not required to signal the handover between cells, whenever the UE leaves the idle mode, e.g., whenever a new data burst is required, the transition from idle mode to connected mode triggers a significant amount of signaling. For example, Non-Access Stratum (NAS) signaling, Radio Resource Control (RRC) signaling, and/or S1 Application Part (S1AP) control plane signaling may be required in order for the UE to receive and/or transmit a data burst. Thus, in idle mode, if the UE has any reason to contact the network, it must perform a substantial signaling procedure.

As noted, if the data bursts are infrequent and/or if the UE is in an area with a large number of cells, e.g., in a hyper dense area, both the connected and the idle mode provide an inefficient use of UE and network resources as well as UE battery power.

SUMMARY

In order to address these inefficiencies, aspects presented herein enable a UE to roam and transfer data in a way that utilizes a reduced amount of signaling. This is accomplished by grouping together a set of connected cells such that a UE traveling between the set of connected cells is not required to contact the network, e.g., the UE avoids signaling associated with a hand over between the set of connected cells.

In an aspect of the disclosure, a method, apparatus, and computer program product is provided for wireless communication for reducing hand over signaling at an eNB. For example, the method includes forming a set of connected cells, each cell having a corresponding coverage area. Thereafter, the method includes preserving a state of a UE in an anchor eNB, wherein the anchor eNB is one of the set of connected cells, wherein the UE is in a connected mode. Then, the method maintaining the state of the UE in the anchor eNB, when the UE moves from a coverage area of the anchor eNB to a coverage area of another one of the cells from the set of connected cells.

In another aspect, a method, apparatus, and computer program product is provided for wireless communication with reducing signaling at a UE. For example, the method includes registering with an anchor eNB connected with a set of connected cells. Thereafter, the method includes leaving a coverage area of the anchor eNB while in a connected mode and entering a coverage area of a second cell connected with the set of connected cells while in the connected mode, wherein a state of the UE is preserved at the anchor eNB. For example, the method may include leaving the coverage area of the anchor eNB and entering the coverage area of the second cell without registering with the second cell.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
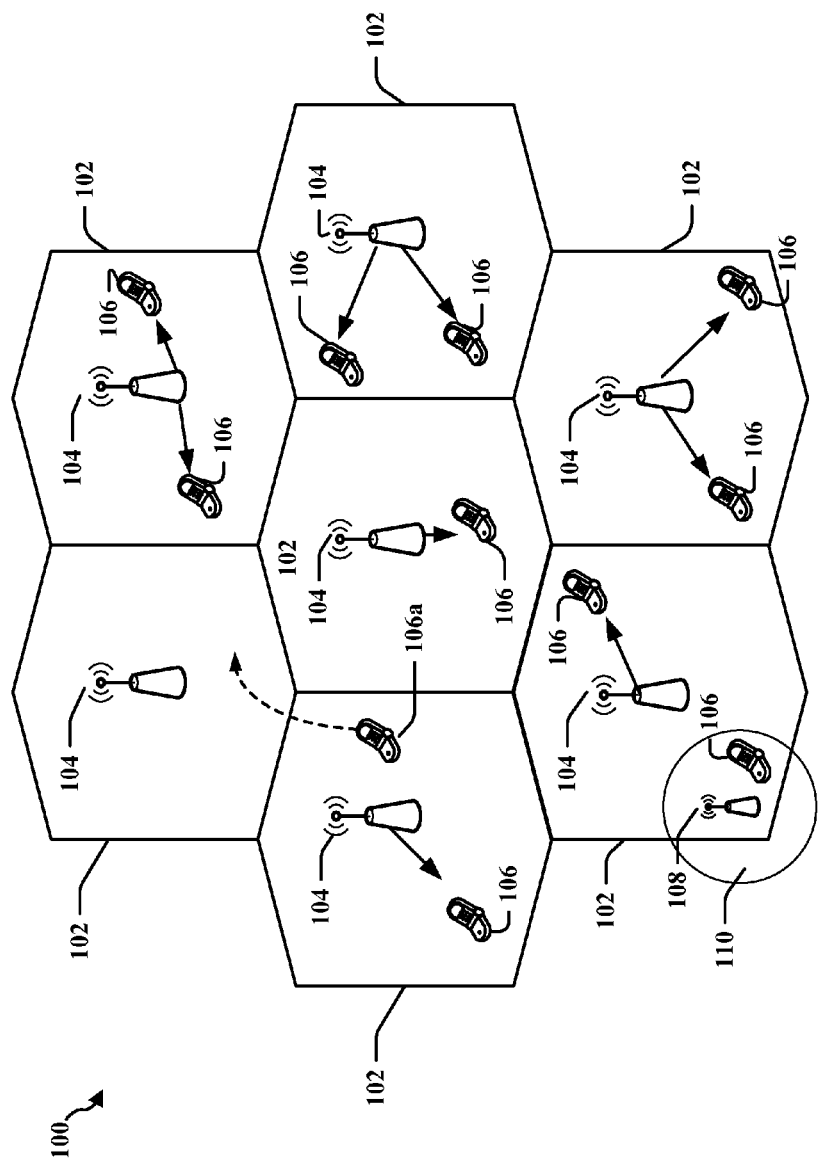
FIG. 1 is a diagram illustrating an example of an access network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to reducing the amount of hand over signaling when a UE in a connected mode moves between cells. A connected group of cells is configured in a manner that enables a state of the UE to be preserved at an anchor node. As the UE moves to a second node within the connected group, the anchor node transfers a state of the UE state to the second node, e.g., via an X2 or S1 communication link, when the UE contacts an evolved universal terrestrial radio access network (E-UTRAN). For example, in an aspect, X2 may be preferably used. When X2 is unavailable, in an aspect, S1 may be used and the state may be provided via the Core Network (CN). This enables the UE to register with an anchor node and thereafter move from the coverage area of the anchor node to a coverage area of a second node, within the connected group, without registering at the second node. The UE can accomplish this even while preserving its state. Alternatively, the anchor node may remain unchanged, in which case the control and data path of the UE can remain anchored in that node.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), a low power base station, or some other terminology. A low power base station, as referenced herein, can include a femto node, a pico node, micro node, home Node B or home evolved Node B (H(e)NB), relay, and/or other low power base stations. For example, a low power base station transmits at a relatively low power as compared to a macro base station associated with a wireless wide area network (WWAN). As such, the coverage area of the low power base station can be substantially smaller than the coverage area of a macro base station.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances; X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Time Division Synchronous Code Division Multiple Access (TD-SCDMA), Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, TD-SCDMA, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of an access network 100 in an LTE network architecture. In this example, the access network 100 is divided into a number of cellular regions (cells) 102. One or more lower power class eNBs 108 may have cellular regions 110 that overlap with one or more of the cells 102. The lower power class eNB 108 may be a femto cell (e.g., home eNB (HeNB)), pico cell, micro cell, or remote radio head (RRH). The macro eNBs 104 are each assigned to a respective cell 102 and are configured to provide an access point to the EPC for all the UEs 106 in the cells 102. There is no centralized controller in this example of an access network 100, but a centralized controller may be used in alternative configurations. The eNBs 104 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 104 may have multiple antennas supporting MIMO technology. The use of MIMO technology enables the eNBs 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 106 with different spatial signatures, which enables each of the UE(s) 106 to recover the one or more data streams destined for that UE 106. On the UL, each UE 106 transmits a spatially precoded data stream, which enables the eNB 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Traditionally, the UE in an LTE access network such as network 200 had the option of two modes—a connected mode and an idle mode. In the connected mode, a handover, as described, is required as the UE traveled between neighbor cells, as illustrated for UE 706a. The corresponding configuration signaled and confirmed with the target cell may cause excessive signaling and/or battery use for a UE with infrequent data bursts.

In the idle mode, while the UE is not necessarily required to signal the handover between neighbor cells, whenever the UE leaves the idle mode, e.g., whenever a new data burst is required, the transition from idle mode to connected mode triggers a significant amount of signaling. For example NAS, RRC, and S1AP signaling is required in order for the UE to receive and/or transmit a data burst. Thus, in idle mode, if the UE has any reason to contact the network, it is required to perform a substantial signaling procedure.

As noted, if the data bursts are infrequent and/or if the UE is in an area with a large number of cells, e.g., in a hyper dense area, the UE must be in either the connected or idle mode. Both of these modes provide an inefficient use of UE and network resources as well as UE battery power.

Aspects presented herein provide a way to reduce the amount of signaling required when a UE travels between cells by forming a connection between multiple cells. As the UE moves between the connected cells, the E-UTRAN does not direct the UE to perform any handovers, but instead the UE can move between the connected cells without registering with each change of cell, even while in a connected mode. This may be achieved by storing a state of the UE at an anchor cell, also referred to as an anchor eNB or anchor node, within the connected set. Thereafter, as the UE moves to another cell within the connected group, the state of the UE is preserved and maintained at the anchor eNB. The state of the UE state may include any of, e.g., radio bearer (RAB) settings and quality of service (QoS) settings. The anchor eNB acts as an "attach point" for the traveling UE. The network sees the anchor eNB as the attach point for the UE. Thus, the UE does not register in the network, but connects to a RAN network and registers via the attach point. Whenever a configuration or state is needed for the UE, the anchor eNB sends such information. The anchor eNB can remain unchanged, or may be changed by transferring the state of the UE to a new eNB, which hence becomes the new anchor eNB for that UE.

Accordingly, in these aspects, the UE contacts the E-UTRAN, e.g., when the UE reselects to a cell outside the connected group or when the UE has UL data or another reason to contact E-UTRAN. The state of the UE may be transferred, e.g., over X2 or S1, to a new cell or eNB when the UE contacts the U-TRAN. For example, X2 may be preferably used. When X2 is unavailable, S1 may be used and the state may be provided via the Core Network (CN).

If the state of the UE cannot be retrieved from the anchor eNB, the UE can follow a legacy registration procedure. This registration procedure may be prompted by the E-UTRAN, e.g., in a page or a reply when the UE contacts the E-UTRAN. Alternatively, the UE may know to perform such a registration when it needs to contact the network. For example, the UE may know to perform such a registration by noticing that the cell it connects through is not a member of the connected group of cells, e.g., a "connected-lite set."

In order to reach the UE while it is within the connected group of cells, a core network (CN) entity or eNB, e.g., an H(e)NB, may page the UE at all of the cells within the connected group. As an alternative or in addition, the CN may send a packet to the anchor eNB. The anchor eNB may forward the packet to each of the members of the connected group. The over-the-air (OTA) communication with the UE can be accomplished using either an idle paging procedure or a DL data arriving procedure, e.g., of a connected mode.

Aspects may include two types of a Connected Lite (Clite) mode, e.g., full Clite and partial Clite. Full Clite mode may provide additional signaling reductions, while including changes at the UE. Partial Clite mode may be implemented with a legacy UE, and may include some of the signaling benefits of full Clite.

Full Connected Lite Mode

In the full Clite mode, the UE may be signaled information identifying a set of connected cells in which it may roam without requiring contact with the E-UTRAN until one of: (a) uplink (UL) data or UL non-access stratum (NAS) signaling is required, (b) the UE is paged for downlink (DL) data, or (c) the UE leaves coverage of the set of connected cells.

In order to identify those cells that are a part of the set of connected cells (also referred to as a connected group), the UE may be informed either via broadcast or unicast. For example, each cell within the set of connected cells may broadcast an identifier that indicates that the cell is part of the set of connected cells. The UE may have information that enables it to identify the set of connected cells using this identifier. Each cell may broadcast a list of its neighboring cells that are part of the set of connected cells, or each cell may broadcast a list of all of the cells that are part of the set of connected cells.

Alternately, the UE may be supplied with information via unicast. For example, the UE may receive an explicit list of neighboring cells in the set of connected cells via a unicast message. As another example, the UE may be supplied with an identifier corresponding to the set of connected cells via unicast, the identifier then enabling the UE to use an identifier broadcast by each cell in order to determine whether the cell is part of the set of connected cells. As another example, the UE may receive radio resource control (RRC) or NAS signaling that supply a list of the set of connected cells or an identifier corresponding to the set of connected cells.

When the UE is in an RRC connected mode, the UE mobility may be handled normally as in RRC connected mode. The E-UTRAN may place the UE in a RRC Connected Lite mode, also referred to herein as a connected lite (Clite) mode. In this mode, UE mobility may be handled as in an Idle Mode within the set of connected cells, until one of the conditions indicated supra occur, e.g., UL/DL data needs to be communicated or the UE leaves coverage of the set of connected cells. When in Clite mode, the UE maintains its context of bearers. The UE may be placed in $C_{lite}$ mode via explicit signaling or implicitly at the expiration of configured timers. The explicit signaling may be sent via, e.g., RRCConnectionReconfiguration. The timer may include the expiration of a long discontinuous reception (DRX) timer, or another specified timer.

The UE mobility in the Clite mode may be governed by similar parameters to an idle mode, while making the UE "sticky" to cells in the Clite group of connected cells. Stickiness may cause to UE to have preferences for the set of connected cells. "Stickiness" may be achieved, e.g. via the application of a Clite-specific $Thresh_x$, Qoffset and Qhyst parameters, which bias the UE to a particular quality of cells so that the UE prefers the cells in the set of connected cells. Additional details can be found, e.g., in section 5.2.4 of 3GPP TS 36.304, a copy of which can be found at http://www.3gpp.org/ftp/Specs/html-info/36304.htm, the entire contents of which are expressly incorporated herein by reference.

As noted supra, UL data or UL signaling may require the UE to exit the Clite connected mode. At this time, the UE performs regular random access channel (RACH) procedures. The UE may have been assigned a set of RACH resources to use when in RRC Clite Connected mode. Normally, a UE would not have a context. However, as the UE is exiting the Clite connected mode, the eNB at whose Clite-set cell the UE RACHes may (a) fetch the UE Context from the anchor node or original source eNB (OSeNB)/latest eNB where UE was connected, (b) identify a cell at which the context may be fetched via eCGI or PCI+EARFCN, or (c) identify the UE contexts in that cell may be performed via CRTNI+shortMacI or any other UE context identifier. After the UE performs the RACH procedure, X2 handover proceeds via one of the options described infra in section A-C described in connection with partial Clite.

Likewise, DL paging of a UE may cause the UE to exit the Clite mode. The OSeNB may need to reach the UE, e.g., when DL data becomes available, or the mobility management entity (MME) pages the UE. The OSeNB may inform cells in the UE's Clite set of connected cells of the page (new X2 message needed), so that the cells may page the UE in their coverage.

When the UE is in the RRC Clite connected mode, a paged UE responds via RACHing, as described in connection with UL data/UL signaling.

When a handover to cells that are not a part of the set of connected cells is desired, the handover may be performed either (a) via a forward handover or (b) by generating a measurement report message (MRM) when the UE approaches a cell outside the set of connected cells. A forward handover may involve the UE using RACH procedures to the new cell, and the eNB of the cell then retrieves the UE context from the OSeNB. For the MRM approach, the identification of the UE approaching a cell outside the set of connected cells may be identified via a physical cell identifier (PCI) and absolute radio frequency channel number (ARFCN) or via E-UTRAN cell global identification (eCGI). Note that sending of the MRM is covered by the "UL data/UL signaling" section.

Partial Connected Lite Mode

In addition to a full Clite mode, a partial Clite mode may be used. In this mode, the UE may function as a legacy UE, without changes. While the UE will not benefit from a reduction is signaling, partial Clite enables some of the reduced signaling benefits to be achieved via the actions of the set of connected cells even when interacting with legacy UEs. Partial Clite may involve changes to the delivery of control plane information. For example, X2 handovers between cells in the set of connected cells may proceed without a Path Switch Message, which informs the CN of a normal handover, at the end of the procedure. For example, steps 1-11 of the call flow in 3GPP TS 36.300, e.g., FIG. 10.1.2.1.1-1, may be followed. However, steps 12-16 are not executed. The UE context may not be immediately executed. Instead a number of potential options may be followed. The entire contents of 3GPP TS 36.300, a copy of which can be found at http://www.3gpp.org/ftp/Specs/html-info/36300.htm, are expressly incorporated herein by reference.

A. OSeNB Functions as an Aggregator of the UE Context

As a first option, the OSeNB, e.g., the last Serving eNB known to MME, may function as an aggregator of the UE context.

The OSeNB may maintain the UE Context. The OSeNB may be informed by a current Serving eNB of any changes to UE context applied to UE. Thus, the OSeNB may function as an aggregator node with respect to the MME, aggregating all of the UE context changes. The OSeNB may also generate its own S1 messages.

A Path Switch Request from the OSeNB may be used to inform the MME when the UE exits the set of connected cells (also referred to herein as the "Clite set"). This requires an additional X2 message between the latest serving eNB and the OSeNB when the UE is handed out to a cell outside the Clite set. Additional details regarding S1 and X2 messages can be found in 3GPP TS 23.401, a copy of which can be found at http://www.3gpp.org/ftp/Specs/html-info/25401.htm, the entire contents of which are expressly incorporated herein by reference.

Alternately, a forward handover may be used to pull the context from OSeNB of the UE when the UE exits the Clite set. In this manner, a target cell outside of the set of connected cells retrieves the context information from the OSeNB.

As another option, the OSeNB may use S1 messages to inform the latest serving eNB of MME-originated S1 messages. A change to the attach point or anchor eNB (e.g., the OSeNB) may also be performed at the time that such a context change is required.

B. OSeNB Generates Path Switch Request

As another alternative, the OSeNB may generate a Path Switch request whenever any UE Context changes must be made, e.g., by the latest serving eNB, that require updating the MME.

C. OSeNB Functions as an S1-GW, X2-GW

As a third alternative, the OSeNB may function as an S1-gateway (GW), and an X2-GW For example, the OSeNB may function as an S1-GW where MME originated S1 messages may be routed by the OSeNB to the latest serving eNB.

Alternatively, the OSeNB may function as an S1-GW where E-UTRAN originated S1 messages are generated by the latest serving eNB and routed by OSeNB. One such message may include a Path Switch Request, e.g., when the UE must be handed outside the Clite set. Thus, in this alternate, path switch messages may be reduced within the Clite set.

While in the partial Clite mode, the UE functions normally. The UE may remain in DRX during this entire time, thus achieving battery savings. As the UE will function normally, over the air signaling may not be saved, because inter-cell handovers continue to be signaled at the RRC level. Likewise, X2 signaling may occur as normal without a reduction, as the X2 interface still needs to handle UE context transfers. Handovers may occur via normal Backward Handovers, via Forward Handover, or via radio link failure (RLF) recovery at a prepared target cell inside the Clite set.

D. Security Key Handling in Partial Connected Lite Mode

A security key is typically shared between a UE, the MME, and the U-TRAN. Changes to the security key typically occur as the UE roams. However, if the MME does not know of the change, e.g., due to reduced signaling on the network side, the UE may not use a new key. Therefore, the UE functions within the Clite set as though it were roaming within cells of a single eNB. In order to avoid desynchronization between the MME and the E-UTRAN, security key handling may be performed as in intra-eNB Handover. Additional details regarding security key handling in an intra-eNB handover can be found in 3 GPP TS 33.401, e.g. section 7.2.8.4.1, a copy of which can be found at http://www.3gpp.org/ftp/Specs/html-info/33401.htm, and the entire contents of which are expressly incorporated by reference herein. At an X2 Handover request time within the Clite set, a list of unused security keys, e.g., network color code (NCC) and next hop (NH) pairs, is made available to the latest target eNB. The latest target cell would then remove the security key that it used before sending the list of available security keys to another target eNB. Thus, the list contains a set of available, unused security keys. When each of the available security keys has been used, horizontal key derivation may be used in order to generate new security keys. When there are no additional unused vertical security keys, e.g., {NCC, NH} pairs, the anchor eNB may request a new set of such security keys from the MME. This request for additional security keys may be made in the form of a replicating handover from the anchor eNB to the target eNB, both being within the set of connected cells. After such a replicating handover, the target node may become the anchor eNB for the set of connected cells.

Figure 2B:
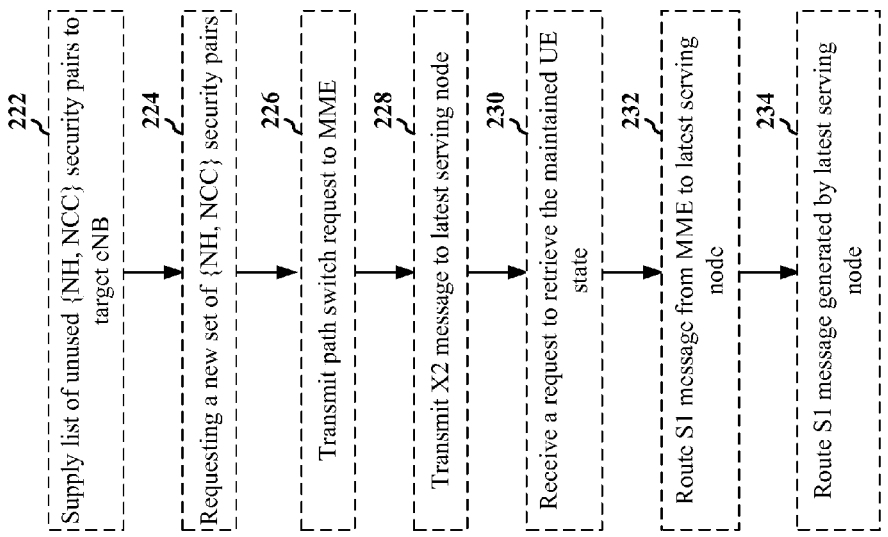
FIGS. 2a and 2b illustrate an example method of communication for reducing hand over signaling.
Figure 2A:
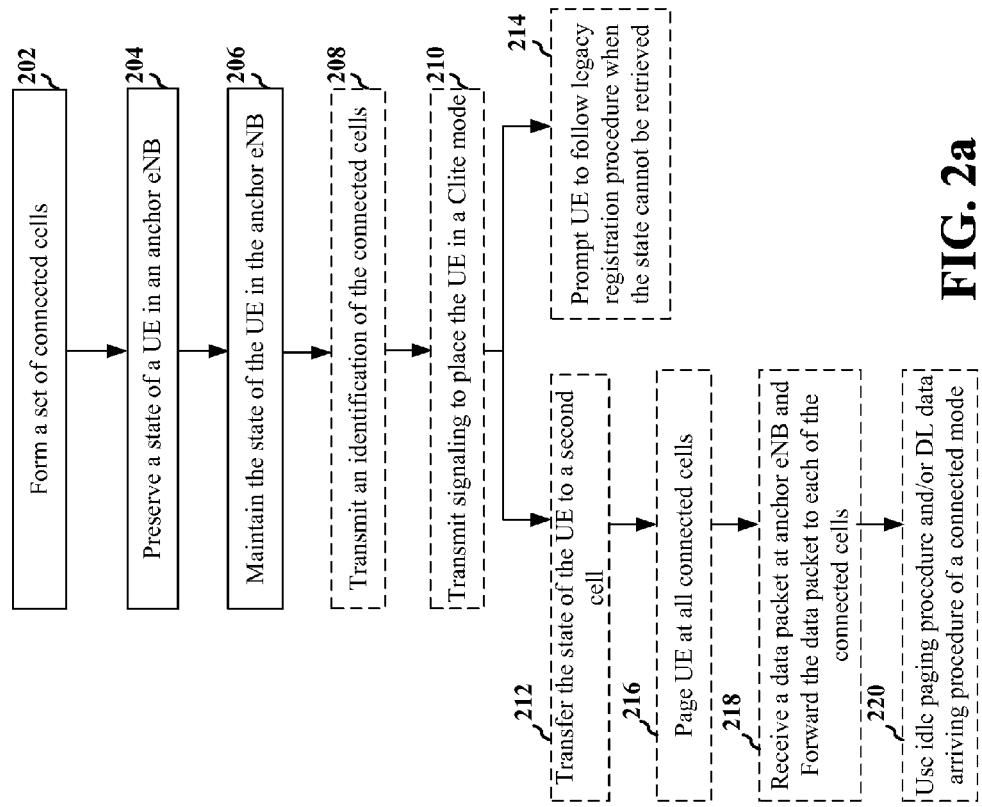

FIGS. 2a and 2b are flow charts of a method of wireless communication for reducing network hand over signaling. The method may be performed by an eNB. Optional aspects are illustrated using a dashed line.

At step 202, the method includes forming a set of connected cells, each cell having a corresponding coverage area. The set of connected cells is connected in a manner that reduces the requirement for handover signaling between the cells. The coverage area of the cells may or may not be contiguous. In an aspect, the forming may be performed by a connection module, e.g., 430 in FIG. 4.

At 204, the method includes preserving a state of the UE in an anchor eNB, wherein the anchor eNB is one of the set of connected cells, and wherein the UE is in a connected mode. For example, the preserved state may comprise at least one of RAB settings and a QoS setting for the UE. The maintained state may also comprise any of, e.g., an identification of the UE, security algorithms for the UE, measurement configurations, physical configurations, antenna configurations, etc. In an aspect, the preserving may be performed by a state preserving module, e.g., 432 in FIG. 4.

At 206, the method maintaining the state of the UE in the anchor eNB, when the UE moves from a coverage area of the anchor eNB to a coverage area of another one of the cells from the set of connected cells. In an aspect, the maintaining may be performed by the state preserving module, e.g., 432 in FIG. 4.

At 208, the method may include transmitting an identification of the set of connected cells to the UE. The transmission may comprise at least one of a broadcast transmission of at least one of an identifier for the set of connected cells, a list of neighboring cells comprised in the set of connected cells, and a list of all cells in the set of connected cells and a unicast transmission of at least one of a list of neighbor cells comprised in the set of connected cells and an identifier for the set of connected cells. The transmission may be sent, e.g., via at least one of RRC signaling and NAS signaling. In an aspect, the transmission may be performed by a communication module, e.g., 434 in FIG. 4.

At 210, the method may include transmitting signaling to the UE to place the UE in a Clite mode. In an aspect, the transmission may be performed by a communication module, e.g., 434 in FIG. 4.

At 212, the method may include transferring the state of the UE from the anchor eNB to a second cell in the set of connected cells when the UE contacts an E-UTRAN. The state of the UE may be transferred from the anchor eNB to the second cell via at least one of X2 and S1. X2 is an interface that is defined between eNBs that enables a previous eNB to forward or tunnel to a new eNB queued packets for a UE. Additional details regarding S1 and X2 interfaces can be found in 3 GPP TS 23.401. In an aspect, the transfer may be performed by a communication module, e.g., 434 in FIG. 4.

The UE may contact the E-UTRAN in certain situations, e.g., when the UE reselects to a cell that is not comprised in the set of connected cells, when the UE transmits UL data, or any other time that the UE has a need to contact the E-UTRAN. Alternatively, UE may contact the E-UTRAN when it reselects to a cell that is not part of a wider paging set. Thus, the method may include receiving a communication from the UE at the E-UTRAN when the UE reselects to a cell that is not comprised in the set of connected cells. The method may include receiving a communication from the UE at the E-UTRAN when the UE transmits uplink data.

When a state of the UE cannot be retrieved from the anchor eNB, the UE may follow a legacy registration procedure. As illustrated at 214, the method may include prompting the UE to follow a legacy registration procedure when the state cannot be retrieved by the anchor eNB.

In order to reach the UE, while the UE is within the coverage area of the set of connected cells, aspects may further include paging the UE at all of the cells in the set in order to transmit downlink data to the UE. Thus, at 216, the method may include paging the UE at all of the cells in the set of connected cells in order to transmit downlink data to the UE.

At 218, the method may include receiving a data packet at the anchor eNB and forwarding the data packet to each of the cells in the set of connected cells in order to transmit the data packet to the UE. In an aspect, the reception and forwarding may be performed by a communication module, e.g., 434 in FIG. 4.

For over-the-air (OTA) communication with the UE, the method may include using at least one of an idle paging procedure and a downlink data arriving procedure of a connected mode in order to communicate with the UE within the set of connected cells at 220 in order to communicate with the UE within the set of connected cells.

FIG. 2b illustrates additional aspects of wireless communication that may be applied, e.g., as part of a partial Clite mode. In this partial Clite mode, the set of connected cells may reduce the amount of handover signaling required for communication with a legacy UE.

At 222, the method may include supplying a list of unused {NH, NCC} security pairs from the anchor eNB to a target eNB at a handover, wherein the target is one of the set of connected cells, and wherein the handover comprises one of an X2 and an S1 type handover. The list of unused {NH, NCC} security pairs may be supplied, e.g., using at least one of a PATH SWITCH REQUEST ACKNOWLEDGE and a S1 HANDOVER REQUEST. When the eNB supplies an empty set of {NH, NCC} security pairs, the target eNB may use horizontally derived keys. In an aspect, the supply may be performed by a communication module, e.g., 434 in FIG. 4.

At 224, the method may include requesting a new set of {NH, NCC} security pairs from a mobility management entity, when there are no more unused {NH, NCC} security pairs. The request for additional {NH, NCC} security pairs may be made in the form of a replicating handover from the anchor eNB to the target eNB, wherein after the replicating handover, the target eNB becomes the anchor eNB for the set of connected cells. In an aspect, the request may be performed by a communication module, e.g., 434 in FIG. 4.

When the UE exits coverage of the set of connected cells, the method may transmitting a path switch request from the anchor eNB to a mobility management entity at 226 and/or transmitting an X2 message from the anchor eNB to a latest serving node at 228. In an aspect, the transmission may be performed by a communication module, e.g., 434 in FIG. 4.

At 230, the method may include receiving, at the anchor eNB, a request to retrieve the maintained state of the UE from a target cell outside of the set of connected cells, when the UE exits coverage of the set of connected cells. In an aspect, the reception may be performed by a communication module, e.g., 434 in FIG. 4.

The anchor eNB may act as an S1 gateway between an MME and a latest serving node, as well as, between the MME and a potential target node, the latest serving node and the potential target node being in the set of connected cells. At 232, the method may further include routing an S1 message received from an MME to the latest serving node via the anchor eNB. The anchor eNB may function as an MME towards the latest serving node and a handover target node, both having a respective set of connected cells. The method may include that the anchor eNB does not notify the MME of S1 signaling at handover, wherein the handover type between the serving and target eNBs comprises at least one of an S1-type and an X2-type.

At 234, the method may include routing, via the anchor eNB, an S1 message generated by a latest serving node in the set of connected cells. The S1 message may comprise, e.g., a path switch request. In an aspect, the routing may be performed by a communication module, e.g., 434 in FIG. 4.

As described above, in an aspect, the transmissions, receptions, and other communication described in connection with steps 208-234 may be performed by a communication module, e.g., 434 in FIG. 4.

Figure 3:
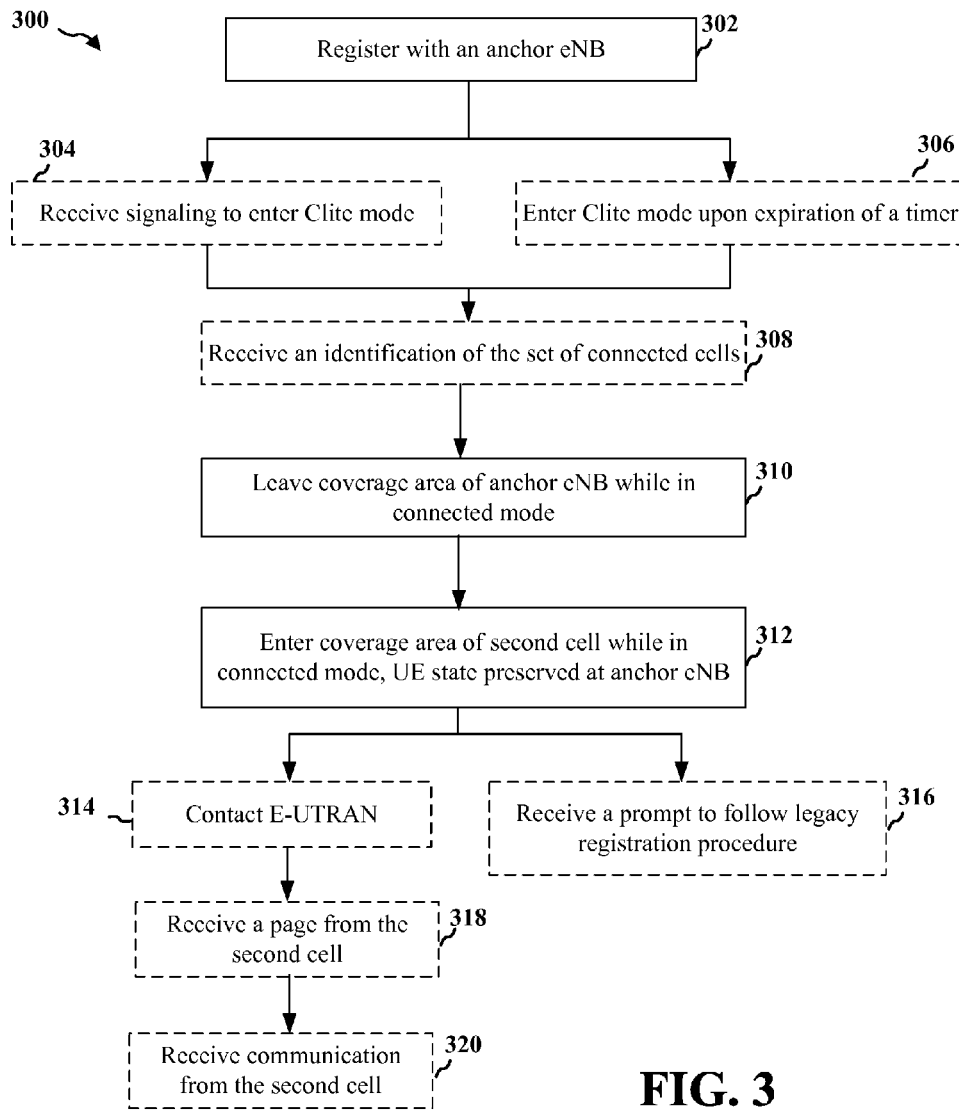
FIG. 3 illustrates an example method of communication for reducing hand over signaling.

FIG. 3 is a flow chart 300 of a method of wireless communication having reduced signaling at a UE. The method may be performed by a UE. As with FIG. 2, optional aspects are illustrated using a dashed line. At step 302, the method may include registering with an anchor eNB connected with a set of connected cells. In an aspect, the registration may be performed by a registration module, e.g., 530 in FIG. 5.

The method may include entering a Clite mode, e.g., while registered with the anchor eNB. In an aspect, entering and exiting a Clite mode may be performed by a Clite module, e.g., 536 in FIG. 5. At 304, the method may include receiving signaling instructing the UE to enter a Clite mode.

For example, a UE may initially begin in an RRC connected mode. The UE may receive signaling from an E-UTRAN placing the UE in the Clite mode, e.g., a RRC Clite connected mode. This mode enables the UE to be handled as in an Idle mode while within coverage of a group of connected cells. While in the Clite mode, the UE maintains its context of bearers. The explicit signaling from an E-UTRAN may be sent via, e.g., RRCConnectionReconfiguration. In an aspect, the reception may be performed by a receiving module, e.g., 534 in FIG. 5.

Alternately, at 306, the method may include entering a Clite mode upon an expiration of a timer. The timer may include or be related to, e.g., a long discontinuous reception (DRX) time. The timer may also be based on another preselected timer.

In order to identify those cells that are a part of the connected group, the UE can be informed of the group of connected cells. Thus, at 308, the method may include receiving an identification of the set of connected cells via at least one of unicast and broadcast. In an aspect, the reception may be performed by a receiving module, e.g., 534 in FIG. 5.

For example, each cell within the connected group can broadcast an identifier that indicates that the cell is part of the connected group. The UE may have information that enables it to identify the connected cells using this identifier. Each cell may broadcast a list of its neighboring cells that are part of the connected group, or each cell may broadcast a list of all of the cells that are part of the connected group. Thus, the method may include that the identification is received as a broadcast of at least one of an identifier for the set of connected cells, a list of neighboring cells comprised in the set of connected cells, and a list of all cells comprised in the set of connected cells.

Alternatively, the UE may be supplied with information via unicast. For example, the identification may be received as a unicast of at least one of a list of neighbor cells comprised in the set of connected cells and an identifier for the set of connected cells.

As another example, the identification may be received via at least one of RRC and NAS signaling.

At step 310, the method may include leaving a coverage area of the anchor eNB while in a connected mode, e.g., the Clite mode. At step 312, the method may include entering a coverage area of a second cell connected with the set of connected cells while in the connected mode, wherein a state of the UE is preserved at the anchor eNB. For example, the UE may leave the coverage area of the anchor eNB and enters the coverage area of the second cell without registering with the second cell. For example, the preserved state of the UE may comprise at least one of a RAB setting and a QoS setting for the UE.

At 314, the method may include contacting an E-UTRAN. The method may include contracting the E-UTRAN in order to reselect to a cell that is not comprised in the set of connected cells UE. The method may include contacting the E-UTRAN in order to transmit uplink data. In an aspect, the contact may be performed by a communication module, e.g., 532 in FIG. 5.

At 316, the method may further receiving a prompt to follow a legacy registration procedure when a state of the UE cannot be retrieved by the anchor eNB. In an aspect, the prompt may be received, e.g., by a receiving module, e.g., 534 in FIG. 5.

At 318, the method may include receiving a page from the second cell, wherein the page is sent from all of the cells in the set in order to transmit downlink data to the UE. In an aspect, the page may be received, e.g., by a receiving module, e.g., 534 in FIG. 5.

At 320, the method may include receiving communication from the second cell. The method may include receiving communication from the second cell via an idle paging procedure, without performing a registration with the second cell. The method may include receiving communication from the second cell via a downlink data arriving procedure of a connected without performing a registration with the second cell. In an aspect, the communication may be received, e.g., by a receiving module, e.g., 534 in FIG. 5.

UE mobility in the RRC Clite connected mode may be governed by similar parameters to an idle mode, while making the UE "sticky" to cells in the Clite group of connected cells. Stickiness may cause to UE to have preferences for the connected group of cells. "Stickiness" may be achieved, e.g. via the application of a Clite-specific Qoffset and Qhyst parameters, which bias the UE to a particular quality of cells so that the UE prefers the cells in the connected group.

The UE may remain in the Clite mode until UL data/UL signaling is required, the UE is paged, e.g., for DL data, and the UE exits coverage of the set of connected cells. Thus, the UE may roam within the set of connected cells without being required to contact the E-UTRAN, similar to an Idle mode, until one of these conditions requires it to exit the Clite mode.

For example, when UL data or UL signaling may require the UE to exit the Clite connected mode, the UE performs regular random access channel (RACH) procedures. The UE may have been assigned a set of RACH resources to use when in RRC Clite Connected mode. Normally, a UE would not have a context. However, as the UE is exiting the Clite connected mode, the eNB at whose Clite-set cell the UE RACHes may (a) fetch the UE Context from the anchor node or original source eNB (OSeNB)/latest eNB where UE was connected, (b) identify a cell at which the context may be fetched via eCGI or PCI+EARFCN, or (c) identify the UE contexts in that cell may be performed via CRTNI+shortMacI or any other UE context identifier.

Likewise, DL paging of a UE may cause the UE to exit the Clite mode. The OSeNB may need to reach the UE, e.g., when DL data becomes available, or the mobility management entity (MME) pages the UE. The OSeNB may inform cells in the UE's Clite connected group of the page (new X2 message needed), so that the cells may page the UE in their coverage.

When the UE is in the RRC Clite connected mode, it responds to a page by RACHing, as described in connection with UL data/UL signaling.

When a handover to cells that are not a part of the connected group is required, the handover can be performed either (a) via a forward handover or (b) by generating a measurement report message (MRM) when the UE approaches a cell outside the group. With a forward handover may involve the UE using RACH procedures to the new cell, and the cell's eNB then retrieves the UE context from the OSeNB. For the MRM approach, the identification of the UE approaching a cell outside the group may be identified via a physical cell identifier (PCI) and absolute radio frequency channel number (ARFCN) or via E-UTRAN cell global identification (eCGI). Note that sending of the MRM is covered by the "UL data/UL signaling" section.

Figure 4:
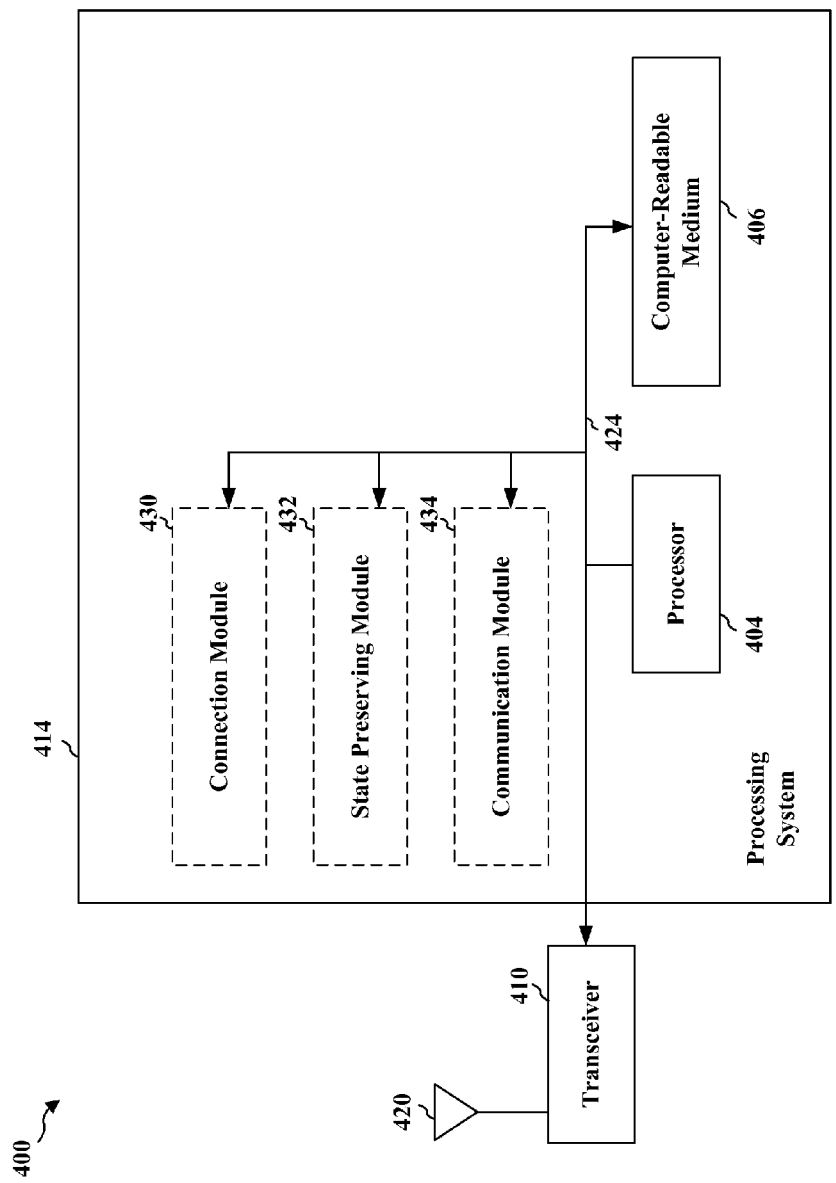
FIG. 4 illustrates an example apparatus for reducing hand over signaling.

FIG. 4 is a diagram 400 illustrating an example of a hardware implementation for an apparatus, such as a network entity or eNB described above, employing a processing system 414 for reducing hand over signaling. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware modules, represented by the processor 404, the modules 430, 432, and 434 for performing the network-based functionality for reducing hand over signaling described herein, and the computer-readable medium 406. The bus 424 may also link various other circuits such as timing sources, peripherals, voltage regulators, and power management circuits, which are well known in the art, and therefore, will not be described any further.

The processing system 414 may be coupled to a transceiver 410. The transceiver 410 is coupled to one or more antennas 420. The transceiver 410 provides a means for communicating with various other apparatus over a transmission medium. The processing system 414 includes a processor 404 coupled to a computer-readable medium 406. The processor 404 is responsible for general processing, including the execution of software stored on the computer-readable medium 406. The software, when executed by the processor 404, causes the processing system 414 to perform the various functions described supra for any particular apparatus. The computer-readable medium 406 may also be used for storing data that is manipulated by the processor 404 when executing software.

As noted, the processing system 414 may include a connection module 430 that is configured to form a connection with other cells, a state preserving module 432 configured to preserve and maintain the state of a UE within a coverage area of the eNB, and a communication module 434 that is configured to communicate with the connected cells and/or the UE. Such communication is described, e.g., in connection with steps 208-234 of FIG. 2. The modules may be software modules running in the processor 404, resident/stored in the computer readable medium 406, one or more hardware modules coupled to the processor 404, or some combination thereof. The processing system 414 may be a component of the eNB 810 and may include the memory 976 and/or at least one of the TX processor 816, the RX processor 870, and the controller/processor 875.

In one configuration, the apparatus for wireless communication includes means for means for forming a set of connected cells, each cell having a corresponding coverage area, means for preserving a state of a user equipment (UE) in an anchor node, wherein the anchor node is one of the set of connected cells, wherein the UE is in a connected mode and maintaining the state of the UE in the anchor node when the UE moves from a coverage area of the anchor node to a coverage area of another one of the cells from the set of connected cells, and means for communicating with other nodes and with the UE. The aforementioned means may be one or more of the aforementioned modules of the apparatus and/or the processing system 414 of the apparatus configured to perform the functions recited by the aforementioned means. As described supra, the processing system 414 may include the TX Processor 816, the RX Processor 870, and the controller/processor 875. As such, in one configuration, the aforementioned means may be the TX Processor 816, the RX Processor 870, and the controller/processor 875 configured to perform the functions recited by the aforementioned means.

Figure 5:
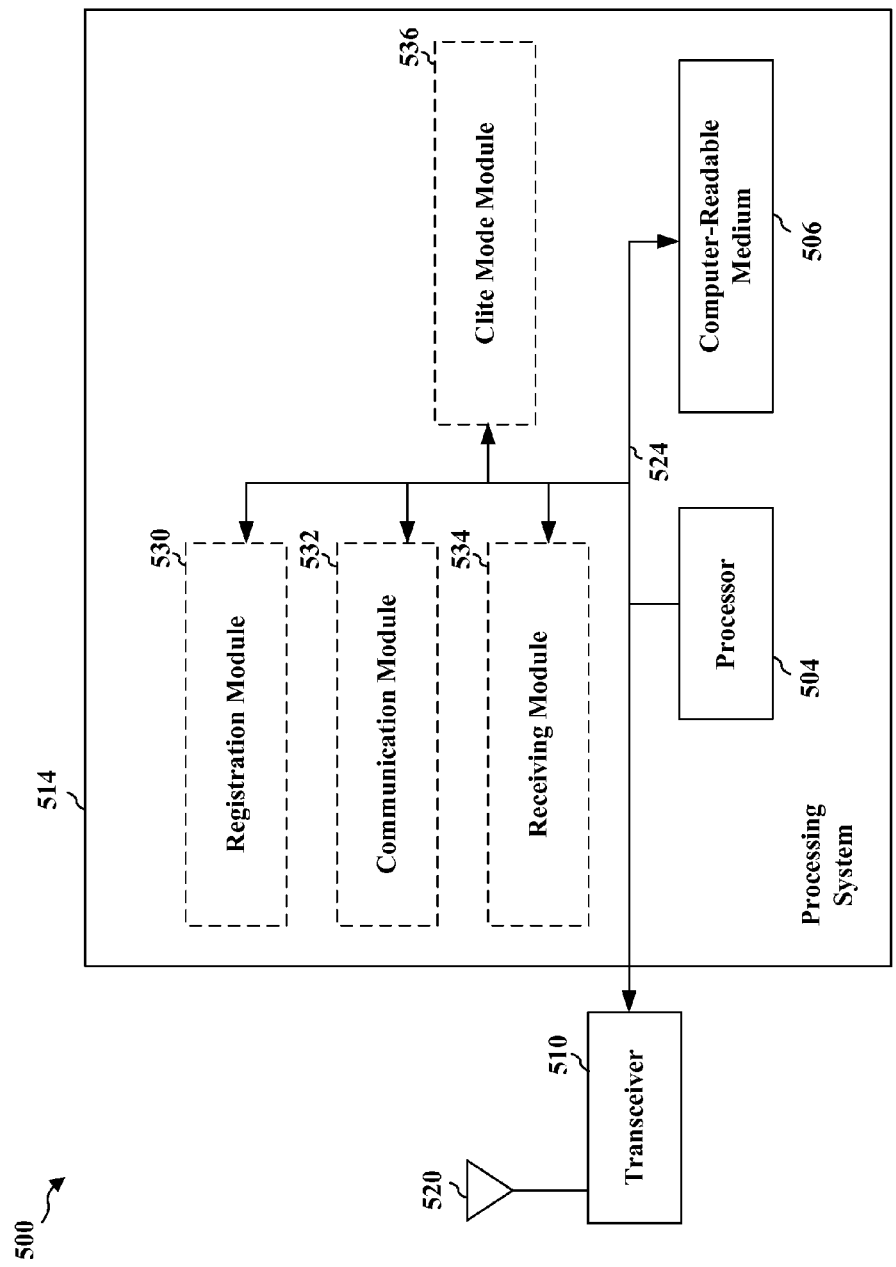
FIG. 5 illustrates an example apparatus for reducing hand over signaling.

FIG. 5 is a diagram 500 illustrating an example of a hardware implementation for an apparatus, such as a UE described above, employing a processing system 514 for wireless communication with reducing signaling. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware modules, represented by the processor 504, the modules 530, 532, 534, and 536 for performing the UE-based functionality having reduced hand over signaling described herein, and the computer-readable medium 506. For example, the apparatus may include a registration module 530 configured to register with an anchor eNB, such that as the UE travels from the coverage area of the anchor eNB into the coverage area of a second node, the UE is not required to register with the second node, when the second node is connected to the anchor eNB. The apparatus 514 may further include a communication module 532 configured to communicate with an eNB, such as the anchor node, the second node, and an E-UTRAN, for example. The apparatus may further include a receiving module 534. The receiving module 534 may be configured, e.g., to receive any of an identification of the set of connected cells, signaling to enter a Clite mode, a prompt to use a legacy registration procedure, a page from an eNB from either the anchor node or another node connected to the anchor node, a packet forward from the anchor node via a node connected to the anchor node, etc. The Clite mode module 536 may be configured to cause the UE to enter and exit a Clite mode. The bus 524 may also link various other circuits such as timing sources, peripherals, voltage regulators, and power management circuits, which are well known in the art, and therefore, will not be described any further.

The processing system 514 may be coupled to a transceiver 510. The transceiver 510 is coupled to one or more antennas 520. The transceiver 510 provides a means for communicating with various other apparatus over a transmission medium. The processing system 514 includes a processor 504 coupled to a computer-readable medium 506. The processor 504 is responsible for general processing, including the execution of software stored on the computer-readable medium 506. The software, when executed by the processor 504, causes the processing system 514 to perform the various functions described supra for any particular apparatus. The computer-readable medium 506 may also be used for storing data that is manipulated by the processor 504 when executing software. As noted above, the processing system 514 includes at least one of the modules 530, 532, 534, and 536. The modules may be software modules running in the processor 504, resident/stored in the computer readable medium 506, one or more hardware modules coupled to the processor 504, or some combination thereof. The processing system 514 may be a component of the UE 850 and may include the memory 660 and/or at least one of the TX processor 868, the RX processor 956, and the controller/processor 959.

In one configuration, the apparatus for wireless communication includes means for means for registering with an anchor cell connected with a set of connected cells, wherein a state of the UE is preserved at the anchor cell when the apparatus leaves a coverage area of the anchor cell and enters a coverage area of a second cell connected with the set of connected cells while in the connected mode, means for receiving communication, means for communicating, e.g., with an eNB and/or the E-UTRAN, means for receiving an identification of the set of connected cells, means for receiving signaling to enter a Clite mode, and means for entering a Clite mode. The aforementioned means may be one or more of the aforementioned modules of the apparatus and/or the processing system 514 of the apparatus configured to perform the functions recited by the aforementioned means. As described supra, the processing system 514 may include the TX Processor 868, the RX Processor 956, and the controller/processor 959. As such, in one configuration, the aforementioned means may be the TX Processor 868, the RX Processor 956, and the controller/processor 959 configured to perform the functions recited by the aforementioned means.

Figure 6:
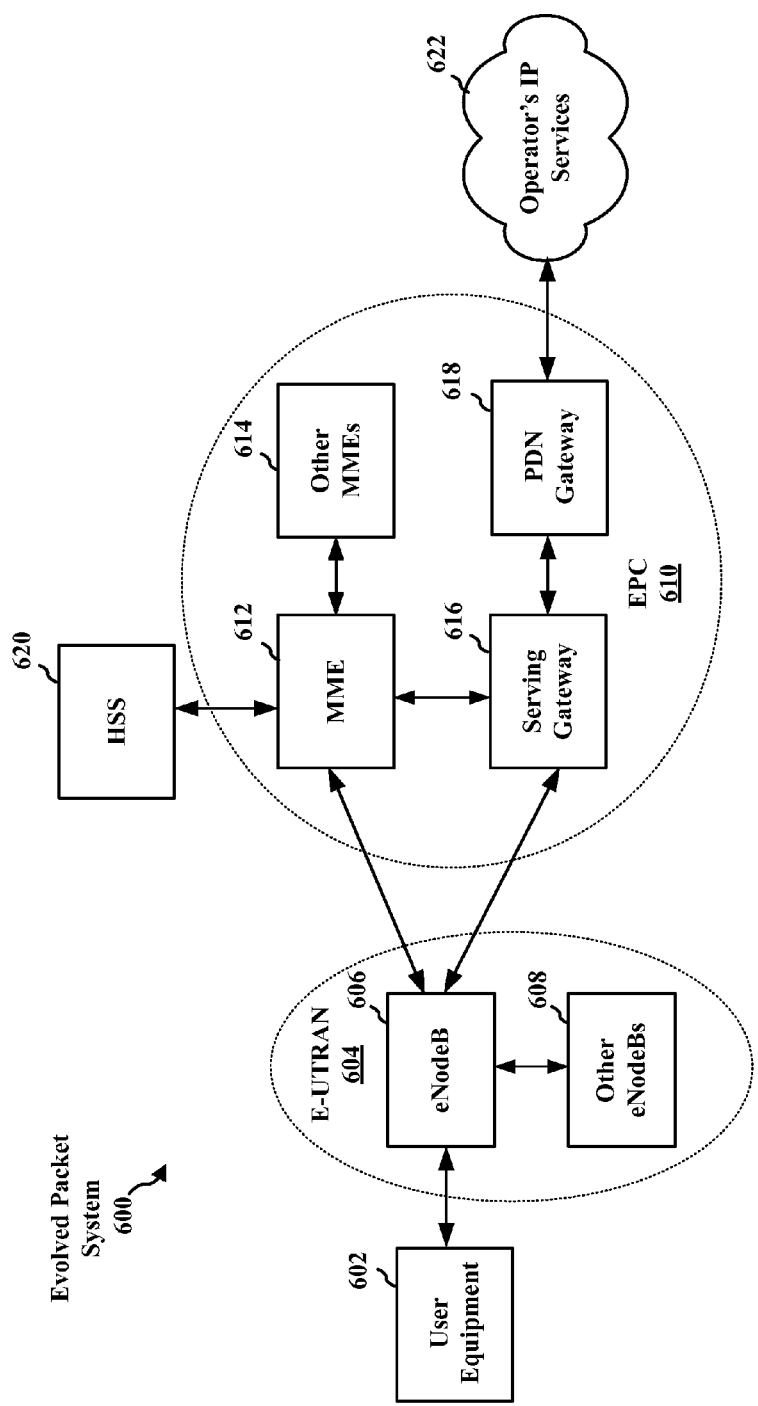
FIG. 6 is a diagram illustrating an example of a network architecture.

FIG. 6 is a diagram illustrating an LTE network architecture 600. The LTE network architecture 600 may be referred to as an Evolved Packet System (EPS) 600. The EPS 600 may include one or more user equipment (UE) 602, an Evolved UMTS Terrestrial Radio Access Network (E-UTRAN) 604, an Evolved Packet Core (EPC) 610, a Home Subscriber Server (HSS) 620, and an Operator's IP Services 622. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 606 and other eNBs 608. The eNB 606 provides user and control planes protocol terminations toward the UE 602. The eNB 606 may be connected to the other eNBs 108 via a backhaul (e.g., an X2 interface). The eNB 606 may also be referred to as a base station, a base transceiver station, a radio base station, a radio transceiver, a transceiver function, a basic service set (BSS), an extended service set (ESS), or some other suitable terminology. The eNB 1606 provides an access point to the EPC 610 for a UE 602. Examples of UEs 602 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 602 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 606 is connected by an S1 interface to the EPC 610. The EPC 610 includes a Mobility Management Entity (MME) 612, other MMEs 614, a Serving Gateway 616, and a Packet Data Network (PDN) Gateway 618. The MME 612 is the control node that processes the signaling between the UE 602 and the EPC 610. Generally, the MME 612 provides bearer and connection management. All user IP packets are transferred through the Serving Gateway 616, which itself is connected to the PDN Gateway 618. The PDN Gateway 618 provides UE IP address allocation as well as other functions. The PDN Gateway 618 is connected to the Operator's IP Services 622. The Operator's IP Services 622 may include the Internet, the Intranet, an IP Multimedia Subsystem (IMS), and a PS Streaming Service (PSS).

Figure 7:
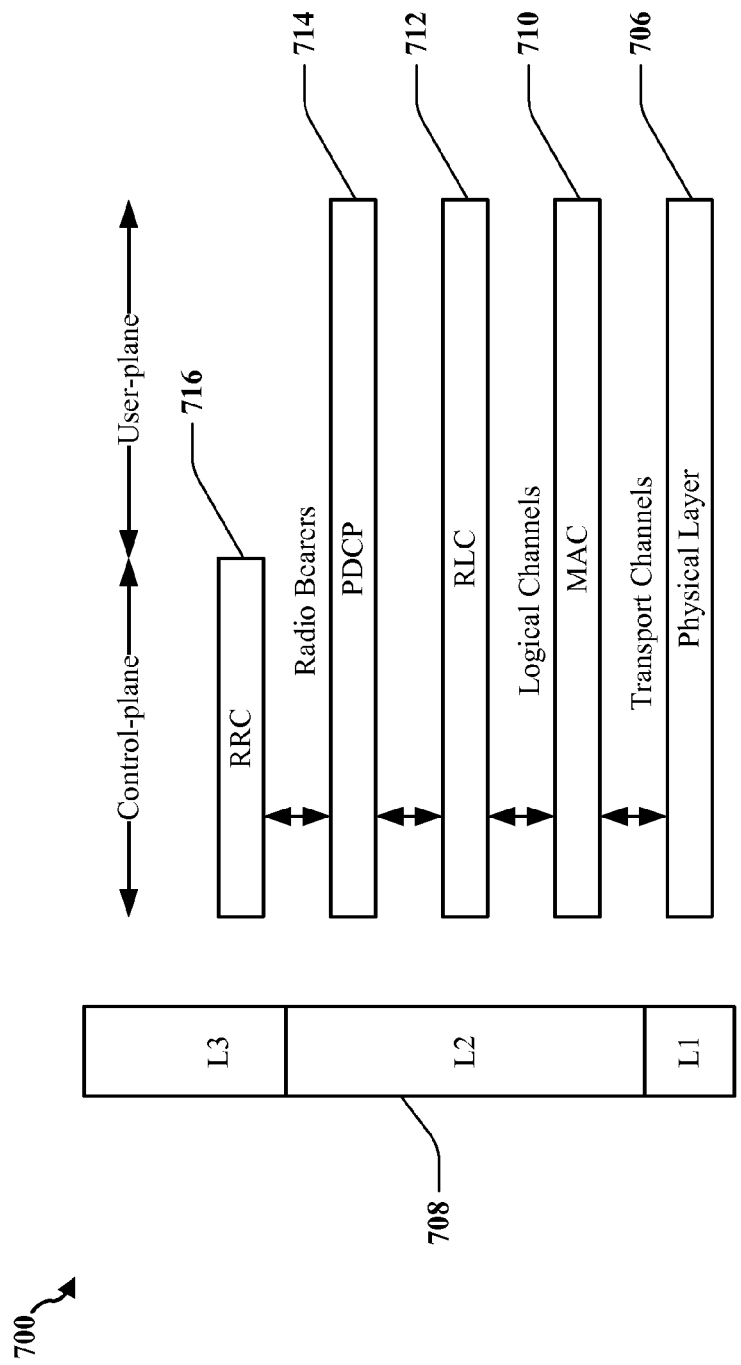
FIG. 7 is a diagram illustrating an example of a radio protocol architecture for the user and control planes.

FIG. 7 is a diagram 700 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 706. Layer 2 (L2 layer) 708 is above the physical layer 706 and is responsible for the link between the UE and eNB over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g., IP layer) that is terminated at the PDN gateway 618 on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3 (L3 layer). The RRC sublayer 716 is responsible for obtaining radio resources (i.e., radio bearers) and for configuring the lower layers using RRC signaling between the eNB and the UE.

Figure 8:
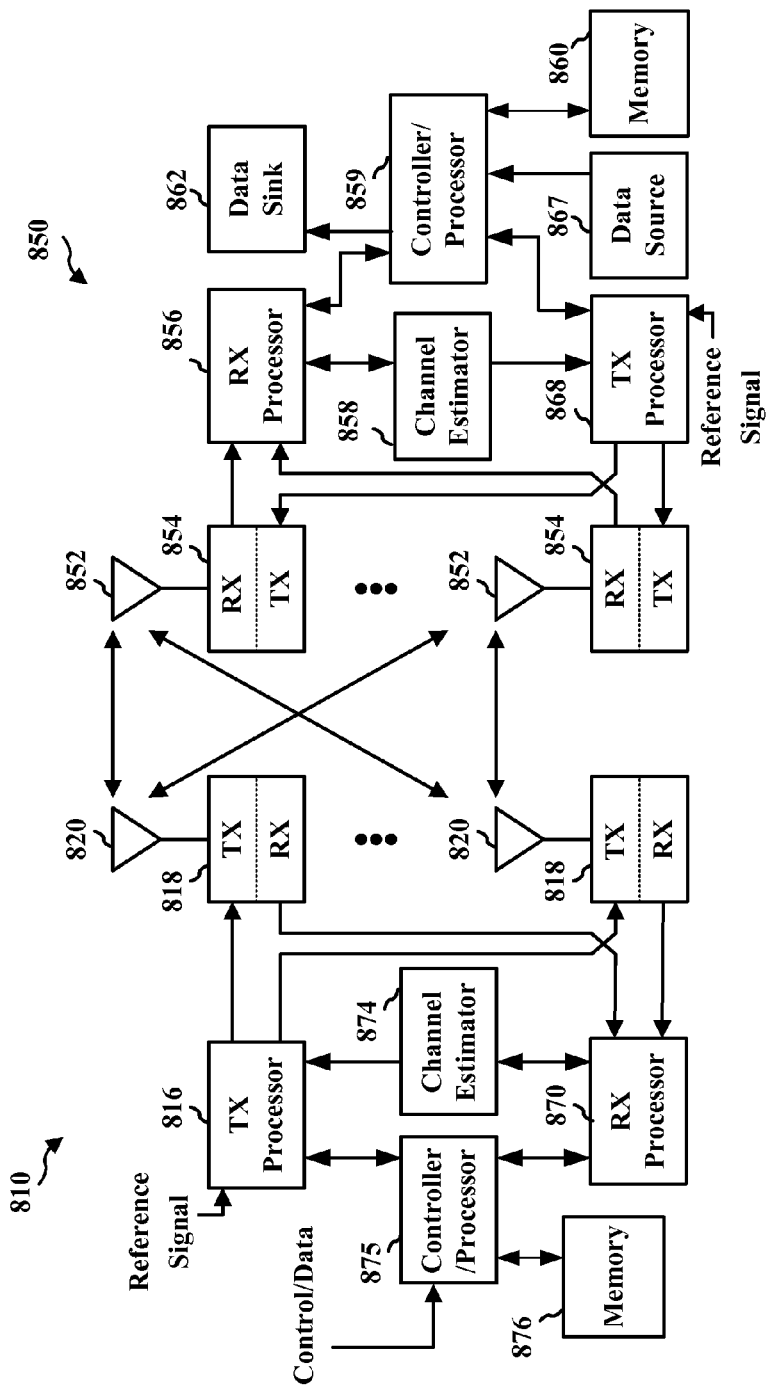
FIG. 8 is a diagram illustrating an example of an evolved Node B and user equipment in an access network.

FIG. 8 is a block diagram of an eNB 810 in communication with a UE 850 in an access network. In the DL, upper layer packets from the core network are provided to a controller/processor 875. The controller/processor 875 implements the functionality of the L2 layer. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The transmit (TX) processor 816 implements various signal processing functions for the L1 layer (i.e., physical layer). The signal processing functions includes coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 850. Each spatial stream is then provided to a different antenna 820 via a separate transmitter 618TX. Each transmitter 818TX modulates an RF carrier with a respective spatial stream for transmission.

At the UE 850, each receiver 854RX receives a signal through its respective antenna 852. Each receiver 854RX recovers information modulated onto an RF carrier and provides the information to the receive (RX) processor 856. The RX processor 856 implements various signal processing functions of the L1 layer. The RX processor 856 performs spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer. The controller/processor can be associated with a memory 860 that stores program codes and data. The memory 860 may be referred to as a computer-readable medium. In the UL, the controller/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer. Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer. Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 are provided to different antenna 852 via separate transmitters 854TX. Each transmitter 854TX modulates an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 may implement the L1 layer.

The controller/processor 875 implements the L2 layer. The controller/processor 875 can be associated with a memory 876 that stores program codes and data. The memory 876 may be referred to as a computer-readable medium. In the UL, the control/processor 875 provides demultiplexing between transport and logical channels, packet reassembly, deciphering, header decompression, control signal processing to recover upper layer packets from the UE 850. Upper layer packets from the controller/processor 875 may be provided to the core network. The controller/processor 875 is also responsible for error detection using an ACK and/or NACK protocol to support HARQ operations.

In addition, it is to be appreciated that eNB 810 and/or UE 850 can employ the systems (FIGS. 1, 4, and 5) and/or methods (FIGS. 2-3) described herein to facilitate wireless communication there between. For example, components or functions of the systems and/or methods described herein can be part of a memory 832 and/or 872 or processors 830 and/or 870 described below, and/or can be executed by processors 830 and/or 870 to perform the disclosed functions.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication for reducing hand over signaling at an evolved Node B (eNB), comprising:
forming a set of connected cells, each cell having a corresponding coverage area;
preserving a state of a user equipment (UE) in an anchor eNB, wherein the anchor eNB is one of the set of connected cells, wherein the UE is in a connected mode;
maintaining the state of the UE in the anchor eNB, when the UE moves from a coverage area of the anchor eNB to a coverage area of another one of the cells from the set of connected cells;
receiving a data packet at the anchor eNB; and
forwarding the data packet to each of the cells in the set of connected cells in order to transmit the data packet to the UE.

2. The method of claim 1, wherein the preserved state of the user equipment comprises one or both of a radio bearer (RAB) setting and a quality of service (QoS) setting for the UE.

3. The method of claim 1, further comprising:
transferring the state of the UE from the anchor eNB to a second cell in the set of connected cells when the UE contacts an Evolved UMTS Terrestrial Radio Access Network (E-UTRAN).

4. The method of claim 3, wherein the state of the UE is transferred from the anchor eNB to the second cell via one or both of X2 and S1.

5. The method of claim 3, further comprising:
receiving a communication from the UE at the E-UTRAN when the UE reselects to a cell that is not comprised in the set of connected cells.

6. The method of claim 3, further comprising:
receiving a communication from the UE at the E-UTRAN when the UE transmits uplink data.

7. The method of claim 3, further comprising:
prompting the UE to follow a legacy registration procedure when the state cannot be retrieved by the anchor eNB.

8. The method of claim 1, further comprising:
paging the UE at all of the cells in the set of connected cells in order to transmit downlink data to the UE.

9. The method of claim 1, further comprising:
using one or both of an idle paging procedure and a downlink data arriving procedure of the connected mode in order to communicate with the UE within the set of connected cells.

10. The method of claim 1, further comprising:
transmitting an identification of the set of connected cells to the UE, wherein the transmission comprises one or both of:
a broadcast transmission of an identifier for the set of connected cells, a list of neighboring cells comprised in the set of connected cells, a list of all cells in the set of connected cells, or a combination thereof; and
a unicast transmission of one or both of a list of neighbor cells comprised in the set of connected cells and an identifier for the set of connected cells.

11. The method of claim 10, wherein the transmission is sent via one or both of radio resource control signaling and non-access stratum signaling.

12. The method of claim 1, further comprising:
transmitting signaling to the UE to place the UE in a connected lite mode.

13. The method of claim 1, further comprising:
supplying a list of unused {NH, NCC} security pairs from the anchor eNB to a target eNB at a handover, wherein the target eNB is one of the set of connected cells, and wherein the handover comprises one of an X2 and an S1 type handover.

14. The method of claim 13, wherein the list of unused {NH, NCC} security pairs is supplied using one or both of a PATH SWITCH REQUEST ACKNOWLEDGE and an S1 HANDOVER REQUEST.

15. The method of claim 14, wherein, when the anchor eNB supplies an empty set of {NH, NCC} security pairs, the target eNB uses horizontally derived keys.

16. The method of claim 14, further comprising:
requesting a new set of {NH, NCC} security pairs from a mobility management entity, when there are no more unused {NH, NCC} security pairs.

17. The method of claim 16, wherein the request for additional {NH, NCC} security pairs is made in the form of a replicating handover from the anchor eNB to the target eNB, wherein after the replicating handover, the target eNB becomes the anchor eNB for the set of connected cells.

18. The method of claim 1, wherein when the UE exits coverage of the set of connected cells, the method further comprises:
transmitting a path switch request from the anchor eNB to a mobility management entity; and
transmitting an X2 message from the anchor eNB to a latest serving node.

19. The method of claim 1, further comprising:
receiving, at the anchor eNB, a request to retrieve the maintained state of the UE from a target cell outside of the set of connected cells, when the UE exits coverage of the set of connected cells.

20. The method of claim 1, wherein the anchor eNB acts as an S1 gateway between a mobility management entity (MME) and a latest serving node and between the MME and a potential target node, the latest serving node and the potential target node being in the set of connected cells.

21. The method of claim 20, the method further comprising:
routing an S1 message received from an MME to the latest serving node via the anchor eNB.

22. The method of claim 20, wherein the anchor eNB functions as an MME towards the latest serving node and a handover target node, both having a respective set of connected cells.

23. The method of claim 22, wherein the anchor eNB does not notify the MME of S1 signaling at handover, wherein a handover type between the serving and target eNBs comprises an S1-type or an X2-type.

24. The method of claim 1, further comprising:
routing, via the anchor eNB, an S1 message generated by a latest serving node in the set of connected cells.

25. The method of claim 24, wherein the S1 message comprises a path switch request.

26. A non-transitory computer readable medium storing computer executable code for reducing hand over signaling at an evolved Node B (eNB), comprising:
code for forming a set of connected cells, each cell having a corresponding coverage area;
code for preserving a state of a user equipment (UE) in an anchor eNB, wherein the anchor eNB is one of the set of connected cells, wherein the UE is in a connected mode;
code for maintaining the state of the UE in the anchor eNB, when the UE moves from a coverage area of the anchor eNB to a coverage area of another one of the cells from the set of connected cells;
code for receiving a data packet at the anchor eNB; and code for forwarding the data packet to each of the cells in the set of connected cells in order to transmit the data packet to the UE.

27. The non-transitory computer readable medium of claim 26, wherein the preserved state of the user equipment comprises one or both of a radio bearer (RAB) setting and a quality of service (QoS) setting for the UE.

28. The non-transitory computer readable medium of claim 26, further comprising:
code for transferring the state of the UE from the anchor eNB to a second cell in the set of connected cells when the UE contacts an Evolved UMTS Terrestrial Radio Access Network (E-UTRAN).

29. An apparatus for wireless communication configured to reduce hand over signaling at an evolved Node B (eNB), comprising:
means for forming a set of connected cells, each cell having a corresponding coverage area;
means for preserving a state of a user equipment (UE) in an anchor eNB, wherein the anchor eNB is one of the set of connected cells, wherein the UE is in a connected mode and maintaining the state of the UE in the anchor eNB, when the UE moves from a coverage area of the anchor eNB to a coverage area of another one of the cells from the set of connected cells;
means for receiving a data packet at the anchor eNB; and
means for forwarding the data packet to each of the cells in the set of connected cells in order to transmit the data packet to the UE.

30. The apparatus of claim 29, wherein the preserved state of the user equipment comprises one or both of a radio bearer (RAB) setting and a quality of service (QoS) setting for the UE.

31. The apparatus of claim 29, further comprising:
means for communicating configured to transfer the state of the UE from the anchor eNB to a second cell in the set of connected cells when the UE contacts an Evolved UMTS Terrestrial Radio Access Network (E-UTRAN).

32. An apparatus for wireless communication configured to reduce hand over signaling at an evolved Node B (eNB), comprising:
a processing system including:
a connection module configured to form a set of connected cells, each cell having a corresponding coverage area;
a state preserving module configured to preserve a state of a user equipment (UE) in an anchor eNB, wherein the anchor eNB is one of the set of connected cells, wherein the UE is in a connected mode and to maintain the state of the UE in the anchor eNB, when the UE moves from a coverage area of the anchor eNB to a coverage area of another one of the cells from the set of connected cells; and
a communication module configured to receive a data packet at the anchor eNB and to forward the data packet to each of the cells in the set of connected cells in order to transmit the data packet to the UE.

33. The apparatus of claim 32, wherein the preserved state of the user equipment comprises one or both of a radio bearer (RAB) setting and a quality of service (QoS) setting for the UE.

34. The apparatus of claim 32, wherein the communication module is further configured to transfer the state of the UE from the anchor eNB to a second cell in the set of connected cells when the UE contacts an Evolved UMTS Terrestrial Radio Access Network (E-UTRAN).

35. The apparatus of claim 34, wherein the state of the UE is transferred from the anchor eNB to the second cell via one or both of an X2 and an S1.

36. The apparatus of claim 34, wherein the communication module is further configured to receive a communication from the UE at the E-UTRAN when the UE reselects to a cell that is not comprised in the set of connected cells.

37. The apparatus of claim 34, wherein the communication module is further configured to receive a communication from the UE at the E-UTRAN when the UE transmits uplink data.

38. The apparatus of claim 34, wherein the communication module is further configured to prompt the UE to follow a legacy registration procedure when the state cannot be retrieved by the anchor eNB.

39. The apparatus of claim 32, wherein the communication module is further configured to page the UE at all of the cells in the set of connected cells in order to transmit downlink data to the UE.

40. The apparatus of claim 32, wherein the communication module is further configured to use one or both of an idle paging procedure and a downlink data arriving procedure of the connected mode in order to communicate with the UE within the set of connected cells.

41. The apparatus of claim 32, wherein the communication module is further configured to transmit an identification of the set of connected cells to the UE, wherein the transmission comprises one or both of:
a broadcast transmission of an identifier for the set of connected cells, a list of neighboring cells comprised in the set of connected cells, a list of all cells in the set of connected cells, or a combination thereof; and
a unicast transmission of one or both of a list of neighbor cells comprised in the set of connected cells and an identifier for the set of connected cells.

42. The apparatus of claim 41, wherein the transmission is sent via one or both of radio resource control signaling and non-access stratum signaling.

43. The apparatus of claim 32, wherein the communication module is further configured to transmit signaling to the UE to place the UE in a connected lite mode.

44. The apparatus of claim 32, wherein the communication module is further configured to supply a list of unused {NH, NCC} security pairs from the anchor eNB to a target eNB at a handover, wherein the target eNB is one of the set of connected cells, and wherein the handover comprises one of an X2 and an S1 type handover.

45. The apparatus of claim 44, wherein the list of unused {NH, NCC} security pairs is supplied using one or both of a PATH SWITCH REQUEST ACKNOWLEDGE and a S1 HANDOVER REQUEST.

46. The apparatus of claim 45, wherein, when the anchor eNB is configured to supply an empty set of {NH, NCC} security pairs, the target eNB is configured to use horizontally derived keys.

47. The apparatus of claim 45, wherein the communication module is further configured to request a new set of {NH, NCC} security pairs from a mobility management entity, when there are no more unused {NH, NCC} security pairs.

48. The apparatus of claim 47, wherein the request for additional {NH, NCC} security pairs is made in the form of a replicating handover from the anchor eNB to the target eNB, wherein after the replicating handover, the target eNB is configured to become the anchor eNB for the set of connected cells.

49. The apparatus of claim 32, wherein when the UE is configured to exit coverage of the set of connected cells, the communication module is further configured to transmit a path switch request from the anchor eNB to a mobility management entity and to transmit an X2 message from the anchor eNB to a latest serving node.

50. The apparatus of claim 32, wherein the communication module is further configured to receive, at the anchor eNB, a request to retrieve the maintained state of the UE from a target cell outside of the set of connected cells, when the UE exits coverage of the set of connected cells.

51. The apparatus of claim 32, wherein the anchor eNB is configured to act as an S1 gateway between a mobility management entity (MME) and a latest serving node and between the MME and a potential target node, the latest serving node and the potential target node being in the set of connected cells.

52. The apparatus of claim 51, wherein the communication module is further configured to route an S1 message received from an MME to the latest serving node via the anchor eNB.

53. The apparatus of claim 51, wherein the anchor eNB is configured to function as an MME towards the latest serving node and a handover target node, both having a respective set of connected cells.

54. The apparatus of claim 53, wherein the anchor eNB is configured not to notify the MME of S1 signaling at handover, wherein a handover type between the serving and target eNBs comprises an S1-type or an X2-type.

55. The apparatus of claim 32, wherein the communication module is further configured to route, via the anchor eNB, an S1 message generated by a latest serving node in the set of connected cells.

56. The apparatus of claim 55, wherein the S1 message comprises a path switch request.

57. A method of wireless communication for reducing signaling at a user equipment (UE), comprising:
registering with an anchor eNB connected with a set of connected cells;
entering a connected lite mode upon an expiration of a timer related to discontinuous reception with the anchor eNB;
leaving a coverage area of the anchor eNB while in the connected lite mode; and
entering a coverage area of a second cell connected with the set of connected cells while in the connected lite mode, wherein a state of the UE is preserved at the anchor eNB.

58. The method of claim 57, wherein the UE leaves the coverage area of the anchor eNB and enters the coverage area of the second cell without registering with the second cell.

59. The method of claim 57, further comprising:
contacting an Evolved UMTS Terrestrial Radio Access Network (E-UTRAN) in order to reselect to a cell that is not comprised in the set of connected cells.

60. The method of claim 57, further comprising:
contacting an Evolved UMTS Terrestrial Radio Access Network (E-UTRAN) in order to transmit uplink data.

61. The method of claim 57, further comprising:
receiving a prompt to follow a legacy registration procedure when the state of the UE cannot be retrieved by the anchor eNB.

62. The method of claim 61, wherein the preserved state of the user equipment comprises one or both of a radio bearer (RAB) setting and a quality of service (QoS) setting for the UE.

63. The method of claim 57, further comprising:
receiving a page from the second cell, wherein the page is sent from all of the cells in the set of connected cells in order to transmit downlink data to the UE.

64. The method of claim 57, further comprising:
receiving communication from the second cell via an idle paging procedure, without performing a registration with the second cell.

65. The method of claim 57, further comprising:
receiving communication from the second cell via a downlink data arriving procedure of a connected mode without performing a registration with the second cell.

66. The method of claim 57, further comprising:
receiving an identification of the set of connected cells via one or both of a unicast and a broadcast.

67. The method of claim 66, wherein the identification is received as the broadcast of:
an identifier for the set of connected cells,
a list of neighboring cells comprised in the set of connected cells,
a list of all cells comprised in the set of connected cells, or
a combination thereof.

68. The method of claim 66, wherein the identification is received as the unicast of one or both of:
a list of neighbor cells comprised in the set of connected cells, and
an identifier for the set of connected cells.

69. The method of claim 66, wherein the identification is received via one or both of:
radio resource control signaling, and
non-access stratum signaling.

70. A non-transitory computer readable medium storing computer executable code for reducing signaling at a user equipment (UE), comprising:
code for registering with an anchor eNB connected with a set of connected cells; and
code for entering a connected lite mode upon an expiration of a timer related to discontinuous reception with the anchor eNB,
wherein when the UE leaves a coverage area of the anchor eNB while in the connected lite mode and enters a coverage area of a second cell connected with the set of connected cells while in the connected lite mode, a state of the UE is preserved at the anchor eNB.

71. The non-transitory computer readable medium of claim 70, wherein the UE leaves the coverage area of the anchor eNB and enters the coverage area of the second cell without registering with the second cell.

72. An apparatus for wireless communication configured to reduce signaling at a user equipment (UE), comprising:
means for registering with an anchor eNB connected with a set of connected cells; and
means for entering a connected lite mode upon an expiration of a timer related to discontinuous reception with the anchor eNB,
wherein when the apparatus is configured to leave a coverage area of the anchor eNB while in the connected lite mode and is configured to enter a coverage area of a second cell connected with the set of connected cells while in the connected lite mode, a state of the UE is preserved at the anchor eNB.

73. The apparatus of claim 72, wherein the apparatus is configured to leave the coverage area of the anchor eNB and is configured to enter the coverage area of the second cell without registering with the second cell.

74. An apparatus for wireless communication configured to reduce signaling at a user equipment (UE), comprising:
a processing system including:
a registration module configured to register with an anchor eNB connected with a set of connected cells; and a connected lite module configured to enter a connected lite mode upon an expiration of a timer related to discontinuous reception with the anchor eNB,
wherein when the apparatus is configured to leave a coverage area of the anchor eNB while in the connected lite mode and is configured to enter a coverage area of a second cell connected with the set of connected cells while in the connected lite mode, a state of the UE is preserved at the anchor eNB.

75. The apparatus of claim 74, wherein the UE is configured to leave the coverage area of the anchor eNB and is configured to enter the coverage area of the second cell without registering with the second cell.

76. The apparatus of claim 74, further comprising:
a communication module configured to contact an Evolved UMTS Terrestrial Radio Access Network (E-UTRAN) in order to reselect to a cell that is not comprised in the set of connected cells.

77. The apparatus of claim 74, further comprising:
a communication module configured to contact an Evolved UMTS Terrestrial Radio Access Network (E-UTRAN) in order to transmit uplink data.

78. The apparatus of claim 74, further comprising:
a receiving module configured to receive a prompt to follow a legacy registration procedure when the state of the UE cannot be retrieved by the anchor eNB.

79. The apparatus of claim 78, wherein the preserved state of the user equipment comprises one or both of a radio bearer (RAB) setting and a quality of service (QoS) setting for the UE.

80. The apparatus of claim 74, further comprising:
a receiving module configured to receive a page from the second cell, wherein the page is sent from all of the cells in the set of connected cells in order to transmit downlink data to the UE.

81. The apparatus of claim 74, further comprising:
a receiving module configured to receive communication from the second cell via an idle paging procedure, without performing a registration with the second cell.

82. The apparatus of claim 74, further comprising:
a receiving module configured to receive communication from the second cell via a downlink data arriving procedure of a connected mode without performing a registration with the second cell.

83. The apparatus of claim 74, further comprising:
a receiving module configured to receive an identification of the set of connected cells via one or both of a unicast and a broadcast.

84. The apparatus of claim 83, wherein the receiving module is configured to receive the identification as the broadcast of:
an identifier for the set of connected cells,
a list of neighboring cells comprised in the set of connected cells,
a list of all cells comprised in the set of connected cells, or
a combination thereof.

85. The apparatus of claim 83, wherein the receiving module is configured to receive the identification as the unicast of one or both of:
a list of neighbor cells comprised in the set of connected cells, and
an identifier for the set of connected cells.

86. The apparatus of claim 85, wherein the receiving module is configured to receive the identification via one or both of:
radio resource control signaling, and
non-access stratum signaling.

87. A method of wireless communication for reducing signaling at a user equipment (UE), comprising:
registering with an anchor eNB connected with a set of connected cells;
receiving signaling instructing the UE to enter a connected lite mode;
entering the connected lite mode;
leaving a coverage area of the anchor eNB while in the connected lite mode; and
entering a coverage area of a second cell connected with the set of connected cells while in the connected lite mode, wherein a state of the UE is preserved at the anchor eNB.

88. The method of claim 87, wherein the UE leaves the coverage area of the anchor eNB and enters the coverage area of the second cell without registering with the second cell.

89. The method of claim 87, further comprising:
receiving a prompt to follow a legacy registration procedure when the state of the UE cannot be retrieved by the anchor eNB.

90. The method of claim 89, wherein the preserved state of the user equipment comprises one or both of a radio bearer (RAB) setting and a quality of service (QoS) setting for the UE.

91. An apparatus for wireless communication configured to reduce signaling at a user equipment (UE), comprising:
a transceiver;
at least one processor configured to:
register with an anchor eNB connected with a set of connected cells;
receive via the transceiver signaling instructing the UE to enter a connected lite mode; and
enter the connected lite mode,
wherein when the apparatus is configured to leave a coverage area of the anchor eNB while in the connected lite mode and is configured to enter a coverage area of a second cell connected with the set of connected cells while in the connected lite mode, a state of the UE is preserved at the anchor eNB; and
a memory coupled to the at least one processor.

92. The apparatus of claim 91, wherein the UE is configured to leave the coverage area of the anchor eNB and is configured to enter the coverage area of the second cell without registering with the second cell.

93. The apparatus of claim 91, wherein the at least one processor is further configured to receive a prompt to follow a legacy registration procedure when the state of the UE cannot be retrieved by the anchor eNB.

94. The apparatus of claim 93, wherein the preserved state of the user equipment comprises one or both of a radio bearer (RAB) setting and a quality of service (QoS) setting for the UE.

95. A non-transitory computer readable medium storing computer executable code for reducing signaling at a user equipment (UE), comprising:
code for registering with an anchor eNB connected with a set of connected cells;
code for receiving signaling instructing the UE to enter a connected lite mode; and
code for entering the connected lite mode,
wherein when the UE leaves a coverage area of the anchor eNB while in the connected lite mode and enters a coverage area of a second cell connected with the set of connected cells while in the connected lite mode, a state of the UE is preserved at the anchor eNB.

96. An apparatus for wireless communication configured to reduce signaling at a user equipment (UE), comprising:

means for registering with an anchor eNB connected with a set of connected cells; means for receiving signaling instructing the UE to enter a connected lite mode; and means for entering the connected lite mode, wherein when the apparatus is configured to leave a coverage area of the anchor eNB while in the connected lite mode and is configured to enter a coverage area of a second cell connected with the set of connected cells while in the connected lite mode, a state of the UE is preserved at the anchor eNB.

97. An apparatus for wireless communication configured to reduce hand over signaling at an evolved Node B (eNB), comprising:

a transceiver;

at least one processor configured to:

form a set of connected cells, each cell having a corresponding coverage area;

preserve a state of a user equipment (UE) in an anchor eNB, wherein the anchor eNB is one of the set of connected cells, wherein the UE is in a connected mode;

maintain the state of the UE in the anchor eNB, when the UE moves from a coverage area of the anchor eNB to a coverage area of another one of the cells from the set of connected cells; and receive a data packet at the anchor eNB and to forward the data packet to each of the cells in the set of connected cells in order to transmit the data packet to the UE; and a memory coupled to the at least one processor.

98. An apparatus for wireless communication configured to reduce signaling at a user equipment (UE), comprising:

a transceiver;

at least one processor configured to:

register with an anchor eNB connected with a set of connected cells; and enter a connected lite mode upon an expiration of a timer related to discontinuous reception with the anchor eNB, wherein when the apparatus is configured to leave a coverage area of the anchor eNB while in the connected lite mode and is configured to enter a coverage area of a second cell connected with the set of connected cells while in the connected lite mode, a state of the UE is preserved at the anchor eNB; and a memory coupled to the at least one processor.

* * * * *